Oct. 21, 1924.
1,512,303
J. F. PACE
MOWER ATTACHMENT
Filed March 24, 1923
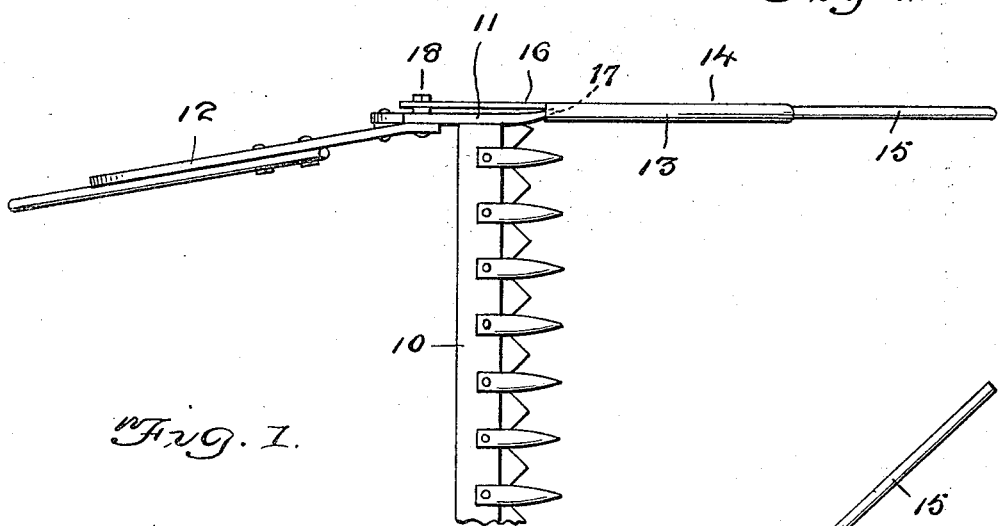
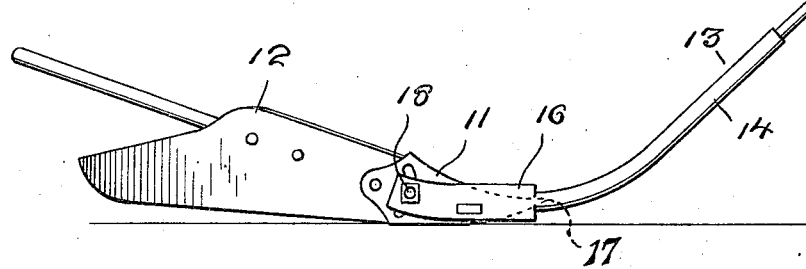
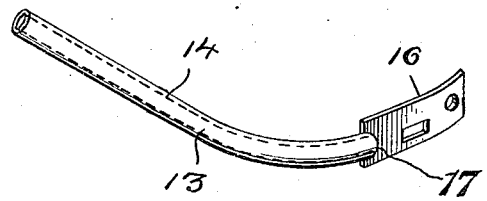
J. F. Pace
INVENTOR
BY Victor J. Evans
ATTORNEY
WITNESS:

Patented Oct. 21, 1924.

1,512,303

UNITED STATES PATENT OFFICE.

JAMES F. PACE, OF GROVE, OKLAHOMA.

MOWER ATTACHMENT.

Application filed March 24, 1923. Serial No. 627,391.

*To all whom it may concern:*

Be it known that I, JAMES F. PACE, a citizen of the United States, residing at Grove, in the county of Delaware and State of Oklahoma, have invented new and useful Improvements in Mower Attachments, of which the following is a specification.

This invention relates to improvements in mowing machines and has for an object the provision of improved means carried at the outer end of the cutter bar for dividing grain, hay or other crops and directing the same to said bar, so as to entirely cut the stalks and leave a clearly defined wall along the edge of the swath.

Another object of the invention is the provision of a divider bar of sectional formation, in which one section is removable so as to permit of the ready substitution of a section of a different length, to adapt the invention for use with crops of different height.

Another object of the invention is the provision of novel means for securing the divider bar in place, the said means utilizing the shoe of the cutter bar and its attaching belt, so that no additional means are necessary.

With the above and other objects in view, the invention further includes the following novel features and details of construction, to be hereinafter more fully described, illustrated in the accompanying drawings and pointed out in the appended claim.

In the drawings:—

Figure 1 is a side elevation of a cutter bar with the invention applied thereto.

Figure 2 is a bottom plan view showing the outer end of the cutter bar with the invention applied.

Figure 3 is a detail perspective view of the inner section of the divider bar.

Referring in detail to the drawings, wherein like characters of reference denote corresponding parts, the reference character 10 indicates the usual cutter bar of a mowing machine which is supported at its outer end by means of a shoe 11 and the latter may have extending rearwardly therefrom the usual divider board 12.

The improved divider bar which is indicated generally at 13 comprises an inner section 14 and an outer section 15. The inner section 14 may if desired be constructed of pipe or tubing and may have its inner end flattened as at 16 and provided with an opening 17. This flattened end is adapted to extend along the shoe 11 in a manner to permit the pointed end of the shoe to enter the opening 17. The rear end of the section 16 is provided with an opening for the passage of a bolt 18 which also passes through an opening ordinarily provided in the shoe 11.

The section 14 of the divider bar extends upwardly at an incline and removably positioned within the outer open end of this section is a section 15, which may if desired be of wood and of any desired length. Various lengths of the sections 15 may be provided and the section which is especially adapted to the height of the crop may be used.

While the inner section 14 is shown and described as of hollow tubular material, such as pipe, it is obvious that this section may be of a different construction, such as a casting provided at its outer end with a socket for the reception of the removable section 15.

As the divider bar extends forwardly and upwardly from the outer end of the cutter bar, it will travel in advance of the said cutter bar and act to separate and divide the crop so as to direct that portion of the crop immediately in advance of the cutter bar toward the latter. This will provide for a clean cut swath, leaving a clearly defined wall along its edge. The invention is especially useful in separating crops which include vines and which may have become tangled or massed with relatively tall grass or grain.

The invention is susceptible of various changes in its form, proportions and minor details of construction and the right is herein reserved to make such changes as properly fall within the scope of the appended claim.

Having described the invention what is claimed is:—

The combination with a cutter bar having a forwardly extending pointed shoe, of a divider bar comprising a curved tubular member open at each end and adapted to receive the pointed end of the shoe in one end thereof, a substantially flat plate extending from the last mentioned end of the tubular member and means for securing said plate to said shoe.

In testimony whereof I affix my signature.

JAMES F. PACE.